United States Patent [19]

Huellwegen

[11] 4,019,114
[45] Apr. 19, 1977

[54] CIRCUIT ARRANGEMENT FOR THE UNGROUNDED TRANSMISSION OF SIGNALS THROUGH TESTING POINTS IN COMMUNICATION FACILITIES

[75] Inventor: Josef Huellwegen, Altenbeken, Germany

[73] Assignee: Nixdorf Computer AG, Paderborn, Germany

[22] Filed: Mar. 7, 1975

[21] Appl. No.: 556,410

[30] Foreign Application Priority Data

Mar. 12, 1974 Germany .......................... 2411871

[52] U.S. Cl. .................................... 321/2; 331/112
[51] Int. Cl.² ........................................ H02M 3/335
[58] Field of Search ............ 321/2, 2 HF; 331/112, 331/117

[56] References Cited

UNITED STATES PATENTS

| 3,200,261 | 8/1965 | Fischman ...................... 331/112 X |
| 3,708,741 | 1/1973 | Hekimian ........................... 321/2 X |
| 3,728,558 | 4/1973 | Genuit et al. ....................... 321/2 X |
| 3,909,696 | 9/1975 | Katov et al. ............................ 321/2 |

Primary Examiner—William M. Shoop
Attorney, Agent, or Firm—Woodhams, Blanchard and Flynn

[57] ABSTRACT

A circuit arrangement for the ungrounded transmission of signals through testing points in communication facilities with the aid of high-frequency oscillations. The high-frequency oscillations are controlled on one side of the testing point and are rectified on the other side of the testing point. The rectified signals are utilized to reproduce the signals again. An oscillator is operated in dependency of the signal polarity by the signals without the requirement of external sources of power.

3 Claims, 2 Drawing Figures

4,019,114

CIRCUIT ARRANGEMENT FOR THE UNGROUNDED TRANSMISSION OF SIGNALS THROUGH TESTING POINTS IN COMMUNICATION FACILITIES

FIELD OF THE INVENTION

The invention relates to a circuit arrangement for the ungrounded transmission of signals through testing points in communication facilities with the use of high-frequency oscillations which are signal-controlled on the one side of the testing point and which are rectified on the other side of the testing point to reproduce the signals.

BACKGROUND OF THE INVENTION

A circuit arrangement having a substantially corresponding operating principle is for example known from German Auslegeschrift No. 2,050,994. It operates in such a manner that at the testing point, a transmitter is fed with high-frequency oscillations, whereby this transmitter is converted to a damped condition on a first transfer coil by an arriving d.c. signal through a circuit element on one side of the testing point, which damped condition is evaluated through a second transfer coil for characterizing the d.c. signal on the other side of the testing point. A third transfer coil serves to feed the transmitter from a high-frequency generator. The d.c. signal is characterized by the control of a transistor with the half-waves of high-frequency oscillations, which half-waves appear at the second transfer coil. The transistor is thus converted to a defined switching condition during the signal duration, which condition can be evaluated as a signal.

A further known possibility for transmitting of d.c. signals lies in the use of a transmitter, which transmits the on and off operations of the d.c. signals and thus permits impulselike signal simulations. However, to overcome signal distortions which occur requires a high amount of circuit components.

Further, it is possible to feed a transmitter for transmitting d.c. signals from a special generator having high-frequency oscillations which, corresponding with the d.c. signals, are controlled on the primary side and deliver on the secondary side after rectification again a d.c. signal which corresponds to the supplied d.c. signal. However, in such circuits, due to the preoscillation condition of the high-frequency generator in connection with the transmitter, the transmitting speeds are held within relatively low limits. To increase the transmitting speed, it is also possible to provide accelerating circuits, which improve the preoscillation condition of a generator, however, also increase the expense of the circuit.

From German Auslegeschrift No. 1,244,242 an arrangement for transmitting d.c. signals is known, which operates with a feed-back generator and transforms impulse combinations into square-wave currents or sinusoidal currents, whereby also a rectification after transformation is used. This arrangement operates with a transmitter, in which high-frequency oscillations are produced with the aid of an amplifier and in which a control occurs on the primary side by the d.c. signals, so that on the secondary side after rectification of the oscillations again a d.c. signal is available. The d.c. signal effects thereby on the primary side through a different damping a use or nonuse of the oscillations.

The known possibilities for the ungrounded transmission of signals through testing points have the common disadvantages of a required additional generator with associated current supply, of a limited transmitting speed and of only a limited possibility of analogue reproduction of the signal behind the testig points. Further, a special voltage is always required, which is controlled, so as to speak, through the criteria transmitted through the testing point for the signal reproduction.

The purpose of the invention is to design a circuit arrangement, through which the transmission of analogue or digital signals through testing points is possible with the least possible input and without additional generators having associated current supplies operating at a high transmitting speed to effect an as exact as possible signal reproduction without requiring a special voltage to be switched.

A circuit arrangement of the above-mentioned type is constructed to attain this purpose such that an oscillator feeds a rectifier circuit and is operated in dependency of the signal polarity by the high-frequency oscillations in the inductive coupling and in power adjustment with respect to a load resistor which is adjusted corresponding to the signals to be reproduced.

A circuit arrangement of this type thus operates in such a manner that the inductors of an oscillator define the transmitter at the testing point. This oscillator is operated with the voltage of the signals to be transmitted through the testing point and is not just only controlled. A special coil of the transmitter being part of the oscillator is used for removing the oscillations produced by the generator during each signal. If these oscillations are now rectified and the thereby obtained d.c. current is fed to a load resistor and charging capacitor, then a signal drop occurs which corresponds to the wave form of the input signals, because their amplitude determines the amplitude of the respectively produced oscillations. It is thus possible, to transmit analogue and digital voltage signals through a circuit arrangement of the invention.

The output adjustment of the oscillator to the load resistor is necessary in order to assure, in view of the low signal voltages, an as high as possible output. Same may reach values, which lie at approximately 80%. Furthermore the adjustment to the load resistor brings about a high damping, which favors the preoscillation and decaying behavior of the oscillator. The entire circuit arrangement having a small toroidal core for the oscillator can be stored within a volume of approximately 20 × 10 × 10 mm., this size represents an optimum compared with other components of the signal transmitting technique. It is for example possible to install the circuit into an apparatus plug.

A circuit arrangement of the invention permits, depending on the selection of the high-frequency signal, transmitting speeds of up to 9600 Bd. which corresponds to an oscillating frequency of approximately 1 MHz. This results also from the fact that the circuit arrangement is operated, and not controlled by, the signal voltages themselves and that preoscillation difficulties of the oscillator circuit must not be feared, because a special transmitter with high inductors does not exist and all components of the oscillator may be high-frequency structural parts. To assure a high efficiency and high oscillation amplitudes, the oscillator is built advantageously with a high LC-relationship.

The circuit arrangement of the invention can, due to the fact that the signal voltage is used as the operating voltage for the oscillator, with only one oscillator transmit naturally only signals of a pregiven polarity. If double current signals having an alternating current direction are to be transmitted, then according to a further development of the invention, two oscillators are required, the first inductors of which are associated with different polarities of the input signals and the output coupling coils of which are connected each through a rectifier to a common load resistor.

It is possible with such a circuit arrangement to operate the two input circuits alternately with the signals of the one or of the other polarity. The respectively associated oscillator becomes then effective and produces a high-frequency oscillation, which after rectification results on the secondary side in a direct voltage. By suitably coupling the load resistors, the double current signals can again be produced in a circuit.

A circuit arrangement of the above-mentioned type is advantageously further constructed in such a manner that the first inductors of the oscillators are arranged in similarly constructed circuits which function in response to different current-directions and are connected parallel with one another. Thus, it is possible to provide one single signal input, whereby depending on the polarity of the signals either the one or the other oscillator is switched to become effective.

The circuit arrangement for double current signals can be constructed very advantageously such that each rectifier is connected in series on one side with a coil end of the respective output coupling coil, on the other side with the emitter-collector path of a transistor and that a load resistor which is common to both rectifiers is connected at the connecting points of the one transistor with the other coil end of the other output coupling coil.

In this circuit arrangement the direct voltages obtained from the respective rectification are connected at a common load resistor, namely so that the transistor connected at the outlet side of the respective rectifier and the free coil end of the respective output coupling coil form outputs, which are connected in parallel with the outputs of the respective other, similar arrangement. This type of connection of the positive and the negative signal components at a simultaneous optimum power adjustment between the two oscillators and the common load resistor leads to a further reduction of the circuit expense, which would be created if one would connect the two signal components on the secondary side in a different manner. The transistors, which are connected at the outlet side of the rectifiers, function as valves and prevent the respective negative or positive voltage which occurs at the common load resistor from being short-circuited through the respective other rectifier in the described parallel connection.

BRIEF DESCRIPTION OF THE DRAWING

Exemplary embodiments of the invention will be described hereinafter in connection with the drawing, in which.

DETAILED DISCUSSION

Figure 1:
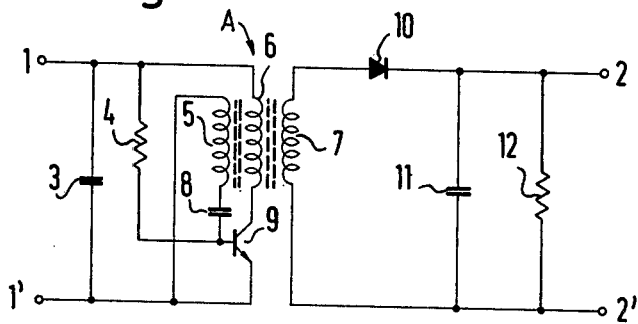
FIG. 1 is a circuit arrangement according to the invention for single current signals.

FIG. 1 illustrates a circuit arrangement for the transmission of single current signals through a testing point. This circuit arrangement has a pair of input terminals 1 and 1' and a pair of output terminals 2 and 2'. The input terminals 1 and 1' define the operating voltage terminals of a high-frequency oscillator A, which contains a transistor 9 functioning as an active element. Further, two inductors 5 and 6 are provided which, together with a coupling capacitor 8, define a feedback generator. The inductor 6 is series connected with the collector-emitter path of a transistor 9 across the input terminals 1 and 1'. The inductor 5 is series connected to a capacitor 8 between the input terminal 1' and the base electrode of a transistor 9. The base potential for the base electrode of the transistor 9 is derived from the signal voltage through a resistor 4. Further, a capacitor 3 is connected in parallel with the feedback generator across the input terminals 1 and 1'. The capacitor 3 shunts the high-frequency oscillations to the inductor 6 and prevents the production of high-frequency oscillations produced by the oscillator from being transmitted backwardly on the connected line.

The oscillator A also includes an output coupling coil 7 series connected with a rectifier 10 which produces a direct current which in turn produces a voltage drop across the load resistor 12 and across the charging capacitor 11. An analogue of the input signal is restored at the output terminal 2 and 2'.

The oscillator A is built with an LC relationship which is as high as possible and is power adjusted to the load resistor 12. As a result, a high-frequency oscillation having an optimum high amplitude is created. The capacitors are kept correspondingly, minimal in the oscillator circuit and in the illustrated case, consist only of coil and coupling capacitors.

The output coupling coil 7 creates a galvanic separation between the input terminals 1 and 1' and the output terminals 2 and 2'. The charging capacitor 11 produces with the load resistor 12 a time constant which is dimensioned such that the signal appearing on the load resistor 12 simulates as closely as possible the input signal.

Figure 2:
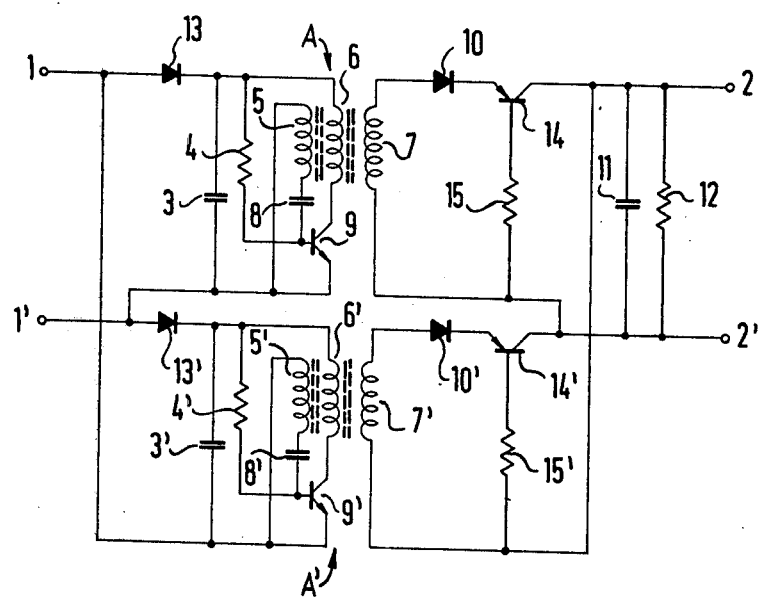
FIG. 2 is a circuit arrangement according to the invention for double current signals.

FIG. 2 illustrates, by using similar reference numerals as was used hereinabove in FIG. 1, another circuit arrangement according to the invention, which forms a testing point for double current signals. The circuits consists substantially of two single circuits of the type shown in FIG. 1. However, what is special is that these single circuits are essentially connected in parallel on the input terminal side and on the output terminal side. The circuits on the primary side are both similarly structured and each contain a diode 13 or 13' series connected with the input terminals 1 and 1' so that the operating circuit receives a current signal, the magnitude of which depends on the respective oscillator A or A'. The two input circuits are connected oppositely parallel with respect to one another between the two input terminals 1 and 1' and the two output terminals. Thus, it is assured that signals of one polarity reach, for example, the upper oscillator A and signals of the other polarity reach the lower oscillator A'. Elements 3 to 9 correspond to the ones which are illustrated in FIG. 1 and are similarly identified. The corresponding components for the oscillator A' are identified by reference numerals 3' to 9' in oscillator circuit A' shown in the lower part of FIG. 2.

Each output coupling coil 7 or 7' of the respective oscillators A or A' feeds a circuit, each of which consists of a rectifier 10 or 10' series connected with the emitter-collector path of a transistor 14 or 14' and the parallel connected charging capacitor 11 and common load resistor 12. The collector electrode of the transistor 14 is connected to the output terminal 2 and the collector-electrode of the transistor 14' is connected to the output terminal 2'. The common load resistor 12 is, as stated above, connected across the output terminals 2 and 2'. In order to prevent the respective positive or negative signal voltage from being short-circuited on the load resistor 12 through one of the rectifiers 10 and 10', the two transistors 14 and 14' function as valves. The transistors 14 and 14' permit the coupling of voltages at the common load resistor 12, which are greater than the threshold voltages of the diodes 10 and 10'. This is of particular importance for transmitting of analogue signals through the testing points. The base control voltages for the two transistors 14 and 14' are also produced from the d.c. voltage obtained through rectification by the rectifiers 10 and 10' and which passes through base resistors 15 and 15'.

The circuit arrangement shown in FIG. 2 could also be designed differently, for example it would be possible to provide two separate load resistors for the two secondary circuits and to unite the voltage components occurring at the two load resistors by resistance networks. The same is also true for the primary circuits. In this manner a push-pull circuit would be realized. Of course, the described circuit is best suited to transmit two voltages of different polarity and size to one common load resistor, without causing additional losses.

As can be taken from the above description, a circuit arrangement according to the invention operates without any external source. The input signals themselves deliver the operating voltage for a high-frequency oscillator, which in view of the smallest possible capacitors and mode of operation which is practically delay-free in the high-frequency zone, permits a high signal-transmitting speed and permits an optimum power output. Thus the circuit arrangement permits a construction of testing points which work continuously with respect to output.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A circuit arrangement for the ungrounded transmission of signals through testing points in communication facilities, said circuit arrangement comprising input terminal means and output terminal means and high-frequency oscillator means having an input thereto and an output therefrom and control means connected in circuit with said input to said high-frequency oscillator means and being responsive to one polarity of an input signal to said input terminal means for controlling the duration and magnitude of oscillations produced by said high-frequency oscillator means at said output therefrom and rectifier means and resistive load means connected in circuit with said output from said high-frequency oscillator means, said output terminal means being connected across said resistive load means, said oscillations at said output from said high-frequency oscillator means being rectified by said rectifier means and the rectified signal applied to said resistive load means for effecting the production of an output signal at said output terminal means which has a shape that corresponds to the shape of said input signal applied to said input terminal means, said circuit arrangement being free of power sources therein and utilizing only said input signal for an operation of said circuit arrangement, said high-frequency oscillator means including two high-frequency oscillators, said control means including two control circuits, one being responsive to one polarity of said input signal and the other being responsive to the opposite polarity of said input signal, said rectifier means including two rectifier circuits, one rectifying said oscillations at said output from one of said high-frequency oscillators and the other rectifying and oscillations at said output from the other of said high-frequency oscillators, and said rectified signals from said rectifier circuits occurring at spaced intervals of time and are each applied to said resistive load means which is common to both of said rectifier circuits so that the shape of said two polarity input signals is reproduced at said output terminal means.

2. The circuit arrangement according to claim 1, wherein each of said high-frequency oscillators have first and second inductors, said first inductor being connected in circuit with said input thereto and said second inductor being inductively coupled to said first inductor and connected in circuit with said output therefrom, and wherein said first inductors of each high-frequency oscillator are connected in parallel.

3. The circuit arrangement according to claim 2, wherein each rectifier circuit is connected on one side thereof in series with a coil end of the respective second inductor and on the other side with an emitter-collector path of a transistor and wherein said resistive load means which is common to both rectifier circuits is connected between the emitter-collector path and a base electrode of said transistors.

* * * * *

UNITED STATES PATENT AND TRADEMARK OFFICE
CERTIFICATE OF CORRECTION

PATENT NO. : 4 019 114

DATED : April 19, 1977

INVENTOR(S) : Josef Huellwegen

It is certified that error appears in the above-identified patent and that said Letters Patent are hereby corrected as shown below:

Column 6, line 29; change "and" to ---said---.

Signed and Sealed this ninth Day of August 1977

[SEAL]

Attest:

RUTH C. MASON
Attesting Officer

C. MARSHALL DANN
Commissioner of Patents and Trademarks